United States Patent Office 2,955,125
Patented Oct. 4, 1960

2,955,125

HERBICIDAL COMPOSITIONS

Carl N. Andersen, Briarcliff Manor, N.Y., assignor to Gallowhur Chemical Corporation, Ossining, N.Y., a corporation of New York No Drawing. Filed Oct. 24, 1956, Ser. No. 617,935

5 Claims. (Cl. 260—443)

This invention relates to novel compositions useful in controlling weeds, particularly crabgrass, and more especially to new organic arsenic compounds and compositions prepared therefrom.

Many organic arsenic compounds are known and have been used with limited success for weed control and particularly for the destruction of crabgrass, but all such compounds have been found to be subject to serious disadvantages; for example, if they are used in a high enough concentration to destroy the weeds or crabgrass, they also have a destructive effect upon turf grass and other desirable vegetation. Such relatively concentrated solutions are, furthermore, quite expensive, and this expense is increased by the fact that their production is inefficient, giving only limited yields, and, furthermore, they are relatively easily and rapidly dissipated by dew and rain, so that the compounds have to be applied more frequently than would otherwise be necessary or desirable.

In accordance with the present invention, new organic compounds of arsenic have been prepared which have been found to be unusually effective and economical in use and which have a highly developed preferential or selective action against crabgrass, broadleaf plant weeds and other undesirable vegetation with a minimum of deleterious action upon turf grasses and other desirable forms of vegetation which it is not wished to damage. These new organic arsenic compounds may be designated as aliphatic arsono aldehydes and are characterized by 1–3 arsono groups linked to a single aliphatic non-aldehydic carbon atom. The sodium and other salts thereof also constitute a part of the present invention.

The new aliphatic arsono aldehydes are produced by reacting sodium arsenite with the appropriate chlorinated aldehyde. The sodium arsenite may be used as such as a starting reactant but is preferably formed in situ during the production of the new aldehydes by alkalinizing arsenic trioxide $As_2O_3$ with sodium hydroxide, as will be more fully apparent from the examples set forth below. It has further been found that one, two or three molecules of sodium arsenite can be combined with the appropriate chlorinated aldehyde to produce compounds containing 1–3 arsono groups linked to a single aliphatic non-aldehydic carbon atom.

The invention is illustrated by the following non-limitative examples:

EXAMPLE 1

*Disodium arsono acetaldehyde*

100 grams of arsenic trioxide $As_2O_3$ was dissolved in a solution of 160 grams of sodium hydroxide NaOH in water. The solution was heated to 70° C. and stirred until solution was complete. Then, while maintaining the solution at 70° C., there was added 125 grams (an excess) of monochloracetaldehyde and agitation was continued for approximately one hour. Upon the addition of the monochloracetaldehyde a vigorous reaction occurred with an increase in temperature so that it was found best to add the monochloracetaldehyde at a slow and uniform rate. When the addition was completed, the solution acquired a reddish tint and an odor of caramelized sugar. It was allowed to stand overnight and in the morning enough glacial acetic acid was added to bring the solution to pH 6, this taking approximately 80 cc. of glacial acetic acid. Any excess alkali was then neutralized and uncombined arsenic trioxide precipitated. The precipitate was separated, washed and dried and weighed 45 grams, indicating a yield of 55%, the total weight being 730 grams. The filtrate was adjusted to pH 7–8 with NaOH and, on boiling the concentrate, the methyl alcohol extract was treated with filtered lime water, a turbidity developed, which redissolved on standing, indicating that the calcium salt was soluble in water or the mother liquor. When a clear solution of lead acetate was added, a greyish precipitate resulted which, after standing over night, was filtered, washed with alcohol and dried. A brownish residue resulted which did not melt at 310° C. but, when the material in the tube was heated with a naked flame, the compound decomposed with the liberation of arsine and the characteristic metallic mirror deposited on the cooler portions of the tube. The compound was tested for solubility and found to be very soluble in water, methyl alcohol, acetone and glycerol. In use, it is diluted with water in which a wetting agent has been incorporated, the effectiveness of the compound being multiplied by such inclusion.

The compound may be represented by the following formula:

$$(NaO)_2AsOCH_2 \cdot CHO$$

EXAMPLE 2

*Tetrasodium diarsono acetaldehyde*

100 grams of arsenic trioxide $As_2O_3$ was dissolved in a solution of 160 grams of sodium hydroxide NaOH in 300 cc. of water, heated to 70° C. and stirred until solution was complete. While maintaining the solution at 70° C., 145 grams of dichloroacetaldehyde was added over a period of one hour under constant agitation. The addition of the aldehyde caused a vigorous reaction and the development of heat and, when the reaction was complete, the mixture was found to be clear and was then allowed to cool to room temperature by standing over night. In the morning, enough glacial acetic acid was added to produce pH 6, the amount of glacial acetic acid so added being approximately 85 cc., the arsenic trioxide precipitated, the solution filtered, and the recovered material washed and dried. The precipitate weighed 48 grams, giving a yield of 52%. The filtrate was adjusted to pH 7–8. The new acetaldehyde was tested for solubility and found to be soluble in water, alcohol, and glycerol. The diarsono acetaldehyde may be represented by the formula:

$$[(NaO)_2AsO]_2 \cdot CH \cdot CHO$$

EXAMPLE 3

*Hexasodium triarsono acetaldehyde*

100 grams of arsenic trioxide $As_2O_3$ was dissolved in a solution of 160 grams of sodium hydroxide NaOH in 300 cc. of water. 50 grams of chloral (trichlorethanal) was carefully added to the warm solution over a period of approximately one hour under agitation and then allowed to cool to room temperature by standing over night. In the morning 160 cc. of glacial acetic acid was added. The precipitated uncombined arsenic trioxide was filtered off, washed and dried, 50 grams of precipitate was recovered, indicating a yield of 50%. The triarsonoacetaldehyde was tested for solubility and was found to be soluble in water, alcohol, acetone, and glycerol. A very characteristic calcium salt is formed in the presence of ammoniacal lime water, allowed to stand over night, filtered, washed with alcohol and dried. The material did not decompose or sinter at 220° C. When heated directly in a glass tube, arsine and a brownish black metallic mirror deposited on the cooler portions of the tube. An insoluble lead salt formed on the addition of lead acetate to the alcoholic mother liquor did not melt at 220° C.

The triarsonoacetaldehyde may be represented by the formula:

Tests were carried out using the new arsonoacetaldehydes at the rate of .25 lb. and 1 lb. per acre and compared with sodium arsenite as a control. In each instance the new arsono aldehyde compounds had a materially greater killing power for weeds and crabgrass than the same concentration of sodium arsenite. In the sunlight it was observed that the arsono acetaldehyde at the concentration mentioned, when sprayed over 450 sq. ft. of ground, gave in two days a dulling and crinkling effect on the ends of the crabgrass. In four to five days, the crabgrass became brown and at the end of one week most of the crabgrass was in a dying condition, especially when the concentration of 1 lb. per acre was employed. At lower concentrations tested for comparative purposes, it was found that the browning was not marked and the tests showed that the optimum amount of arsono aldehyde to get maximum killing effect and minimum browning effect was at the rate of .75 lb. per acre. Only two applications of the solution applied in midsummer were found to be required, especially if the treated plots were exposed to direct sunlight. When the same concentrations were applied to crabgrass in the shade, no browning resulted, but the crabgrass withered and blackened and dried to a dehydrated mass. It was particularly interesting to observe in these tests that, upon direct application of the solutions even at 1 lb. per acre, the most damage suffered by desirable grass and vegetation such as turf grasses is a moderate browning at the extreme ends of the grass shafts. On freshly cut grass, the solution had a slight withering effect which was only temporary because the grass was fully rejuvenated after rain or sprinkling. It was further particularly noted in these tests that in two to three weeks after the application of the arsono aldehydes at a rate of 1 lb. per acre of solution, the regular or desirable grass was greener and more vigorous in growth than before.

The sodium salts, when isolated from the filtrates above described, are well-defined crystalline solids ranging in color from grayish in the case of the mono-arsono compound to white in the case of the tri-arsono compounds.

The present invention accordingly comprises aliphatic arsono aldehydes wherein 1–3 arsono groups are linked to a single aliphatic non-aldehydic carbon atom. The arsono group is a monovalent radical of the formula $(HO)_2AsO-$. The hydrogen may be replaced by Na or other suitable metal, such as an alkali or alkaline earth metal, to give the corresponding salts. These compounds, being soluble in water, may be made up into suitable concentrates which are understood to be intended to be diluted by the user and applied at the rate of approximately .25 to 1 lb. per acre. The invention thus comprises the new arsono aldehydes and their solutions, particularly their aqueous solutions. These solutions are very effective in killing weeds in general, particularly chickweed, dandelion, broad leaf plantain and numerous other weed varieties on which they have a selective killing action.

I claim:

1. A compound selected from the group consisting of an arsono acetaldehyde having 1 to 3 arsono groups linked to its alpha carbon atom, and the alkali and alkaline earth salts thereof.

2. The compound:

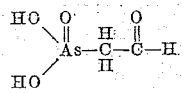

3. The compound:

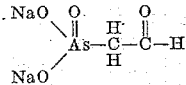

4. The compound:

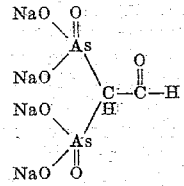

5. The compound:

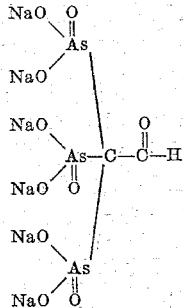

References Cited in the file of this patent

UNITED STATES PATENTS

| | | |
|---|---|---|
| 1,582,775 | Oechslin | Apr. 27, 1926 |
| 1,582,776 | Oechslin | Apr. 27, 1926 |
| 1,653,227 | Pfleger et al. | Dec. 20, 1927 |
| 1,967,628 | Rose | July 24, 1934 |
| 2,312,207 | Clayton et al. | Feb. 23, 1943 |